United States Patent
Lu et al.

(10) Patent No.: US 7,907,210 B2
(45) Date of Patent: Mar. 15, 2011

(54) VIDEO DE-INTERLACING WITH MOTION ESTIMATION

(75) Inventors: Tiehan Lu, Chandler, AZ (US); Jorge E. Caviedes, Mesa, AZ (US); Walid Ali, Chandler, AZ (US); Tsung-Hsin Lu, Fremont, CA (US); Raju Hormis, New York, NY (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/506,002

(22) Filed: Jul. 20, 2009

(65) Prior Publication Data

US 2009/0322942 A1    Dec. 31, 2009

Related U.S. Application Data

(62) Division of application No. 11/091,853, filed on Mar. 28, 2005, now Pat. No. 7,567,294.

(51) Int. Cl.
  *H04N 7/01* (2006.01)
  *H04N 11/20* (2006.01)
  *H04N 5/14* (2006.01)
(52) U.S. Cl. .................. 348/452; 348/448; 348/699
(58) Field of Classification Search .................. 348/448, 348/452, 699; 349/10
  See application file for complete search history.

(56) References Cited

U.S. PATENT DOCUMENTS

| 5,363,146 | A | | 11/1994 | Saunders et al. |
| 5,541,660 | A | * | 7/1996 | Kim et al. ................. 375/240.16 |
| 5,546,130 | A | * | 8/1996 | Hackett et al. ................. 348/447 |
| 5,579,053 | A | | 11/1996 | Pandel |
| 5,642,170 | A | * | 6/1997 | Hackett et al. ................. 348/459 |
| 5,661,525 | A | * | 8/1997 | Kovacevic et al. ............ 348/452 |
| 5,777,682 | A | * | 7/1998 | De Haan et al. .............. 348/452 |
| 5,796,437 | A | * | 8/1998 | Muraji et al. ................. 348/452 |
| 5,886,745 | A | | 3/1999 | Muraji et al. |
| 5,889,890 | A | * | 3/1999 | Heimburger ................. 382/236 |
| 5,995,154 | A | | 11/1999 | Heimburger |
| 6,133,957 | A | | 10/2000 | Campbell |
| 6,141,056 | A | | 10/2000 | Westerman |
| 6,181,382 | B1 | | 1/2001 | Kieu et al. |
| 6,192,079 | B1 | | 2/2001 | Sharma et al. |
| 6,317,165 | B1 | * | 11/2001 | Balram et al. ................. 348/699 |
| 6,331,874 | B1 | * | 12/2001 | de Garrido et al. ........... 348/452 |
| 6,452,639 | B1 | | 9/2002 | Wagner et al. |
| 6,577,345 | B1 | * | 6/2003 | Lim et al. ....................... 348/452 |

(Continued)

OTHER PUBLICATIONS

G. de Haan and E B. Bellers, "De-Interlacing of Video Data", IEEE Transactions on Consumer Electronics, vol. 43, No. 3, Aug. 1997. pp. 819-825.

(Continued)

*Primary Examiner* — Brian Yenke
(74) *Attorney, Agent, or Firm* — Buckley, Maschoff & Talwalkar LLC

(57) ABSTRACT

A method includes determining a lowest-score interpolation direction among a plurality of interpolation directions. The method further includes calculating a candidate pixel value by interpolating along the lowest-score interpolation direction. The method further includes applying a median function to a set of pixel values. The set of pixel values includes (a) the candidate pixel value, (b) at least one pixel value from a line of pixels that is immediately above a pixel location that is currently being interpolated, and (c) at least one pixel value from a line of pixel values that is immediately below the pixel location that is currently being interpolated.

7 Claims, 9 Drawing Sheets

U.S. PATENT DOCUMENTS

| | | |
|---|---|---|
| 6,611,294 B1 | 8/2003 | Hirano et al. |
| 6,661,464 B1 * | 12/2003 | Kokkosoulis et al. ........ 348/448 |
| 6,731,342 B2 | 5/2004 | Shin et al. |
| 6,900,846 B2 * | 5/2005 | Lee et al. ................... 348/459 |
| 7,012,649 B2 * | 3/2006 | Michel ........................ 348/448 |
| 7,042,512 B2 * | 5/2006 | Yang et al. .................. 348/452 |
| 7,057,665 B2 * | 6/2006 | Jung et al. ................... 348/452 |
| 7,075,581 B1 * | 7/2006 | Ozgen et al. ................. 348/448 |
| 7,116,372 B2 * | 10/2006 | Kondo et al. ................ 348/448 |
| 7,142,247 B2 | 11/2006 | Jung |
| 7,161,602 B2 * | 1/2007 | Shan ............................ 345/606 |
| 7,193,655 B2 | 3/2007 | Nicolas |
| 7,199,838 B2 * | 4/2007 | Lin et al. ..................... 348/607 |
| 7,265,791 B2 * | 9/2007 | Song et al. ................... 348/448 |
| 7,315,331 B2 | 1/2008 | Franzen |
| 7,321,400 B1 | 1/2008 | Chou et al. |
| 7,663,695 B2 * | 2/2010 | Pau et al. ..................... 348/452 |
| 7,667,773 B2 * | 2/2010 | Han ............................. 348/452 |
| 7,755,700 B2 * | 7/2010 | Kimura et al. ............... 348/452 |
| 7,796,191 B1 * | 9/2010 | Vojkovich .................... 348/448 |
| 2001/0008425 A1 * | 7/2001 | Shin et al. .................... 348/452 |
| 2002/0027610 A1 | 3/2002 | Jiang et al. |
| 2002/0076121 A1 | 6/2002 | Shimizu et al. |
| 2002/0171759 A1 | 11/2002 | Handjojo et al. |
| 2002/0172288 A1 | 11/2002 | Kwon |
| 2003/0112369 A1 | 6/2003 | Yoo et al. |
| 2004/0114833 A1 | 6/2004 | Jiang |
| 2004/0196909 A1 | 10/2004 | Kwon |
| 2004/0207753 A1 | 10/2004 | Jung |
| 2004/0252766 A1 | 12/2004 | Lee et al. |
| 2004/0257467 A1 | 12/2004 | Nicolas |
| 2005/0179814 A1 | 8/2005 | Pau et al. |
| 2005/0201626 A1 | 9/2005 | Kang et al. |
| 2005/0275753 A1 | 12/2005 | Jung |
| 2006/0139486 A1 * | 6/2006 | Caviedes ..................... 348/452 |
| 2006/0146187 A1 | 7/2006 | Handjojo et al. |
| 2006/0285010 A1 | 12/2006 | Wang et al. |
| 2007/0103485 A1 | 5/2007 | Lu et al. |

OTHER PUBLICATIONS

"Product Overview—FLI2300", Genesis Microchip Inc., 2pgs.
Faroudja, "DCDI®", © 2003-2005 Genesis Microchip Inc. 1pg.

* cited by examiner

VIDEO DE-INTERLACING WITH MOTION ESTIMATION

CROSS-REFERENCE TO RELATED APPLICATION

This is a divisional of co-pending prior U.S. patent application Ser. No. 11/091,853 entitled "Gradient Adaptive Video De-Interlacing" filed Mar. 28, 2005 to be issued as U.S. Pat. No. 7,567,294, which application is incorporated herein by reference.

BACKGROUND

For a variety of applications, it is necessary to convert conventional interlaced video signal frames into a progressive scan format. For example, it may be necessary to convert an interlaced signal received over the air into a progressive scan format for display on a digital video monitor.

A number of de-interlacing techniques have been proposed. According to an inter-field technique known as "weave", the pixel to be generated is taken from the corresponding pixel in the previous field. This technique may result in artifacts when there is motion in the video signal at the point of interpolation.

According to an intra-field technique know as "bob", the pixel value to be generated is interpolated from the two pixels in the same field which are respectively directly above and directly below the pixel to be generated. This technique may result in loss of resolution and creation of certain artifacts.

In another technique, sometimes referred to as "motion adaptive" de-interlacing, motion detection is applied at the point where interpolation is occurring. If there is no motion, a "weave" approach is applied. If there is motion at the current point, a "bob" approach is applied. In another proposed motion adaptive de-interlacing technique, the pixel value to be generated is obtained as a weighted average of the pixel values that would be obtained by the "bob" and "weave" approaches, and the weights applied to the bob and weave pixel values vary depending on the degree of motion. Even with these approaches, however, goals for image quality may not be met.

Another technique is known as "motion compensated" de-interlacing. In this approach, motion between the current field and the previous field is estimated to produce motion vectors at, for example, each pixel location. Then interpolation is performed using pixels from the previous frame that have been relocated in accordance with the motion vectors. Motion compensated de-interlacing generally produces superior results in terms of image quality, but requires a high degree of processing complexity, and may still fall short of the desired level of image quality.

DETAILED DESCRIPTION

Figure 1:
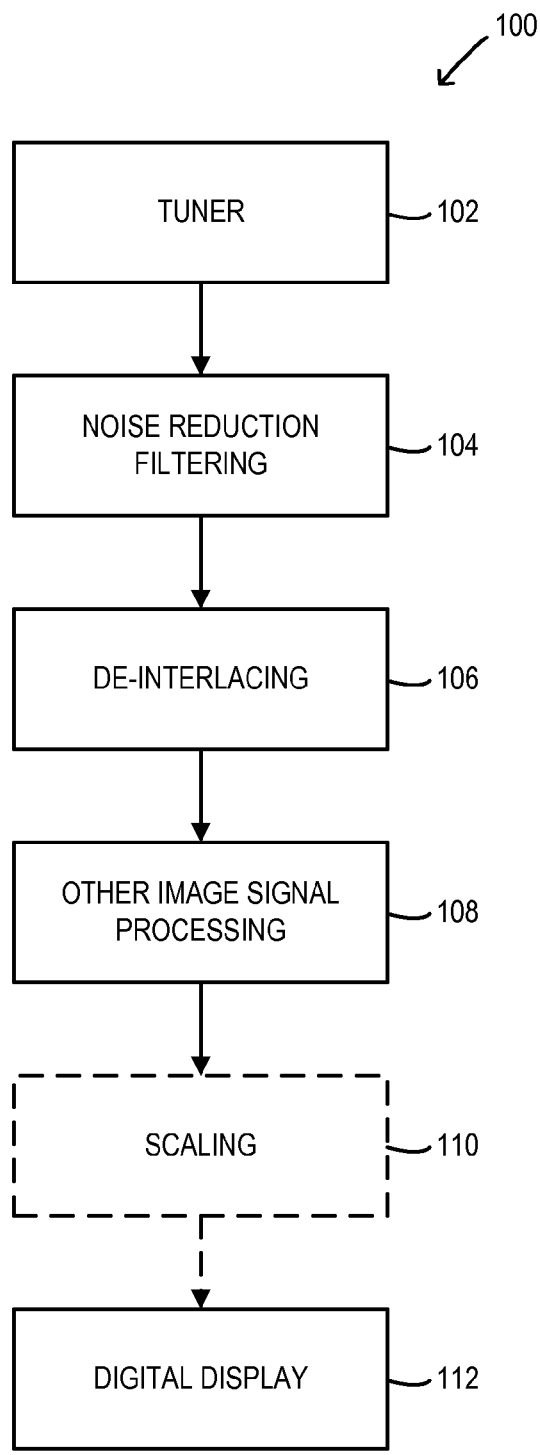
FIG. 1 is a block diagram of an apparatus which performs a de-interlacing process in accordance with some embodiments.

FIG. 1 is a block diagram of an apparatus 100 which performs a de-interlacing process in accordance with some embodiments.

The apparatus 100 includes a tuner 102 or other source of interlaced video signal. Though not separately shown, the tuner 102 may include, if necessary, suitable circuitry for converting the interlaced video signal into a digital interlaced video signal.

The apparatus 100 may also include a noise reduction filtering block 104 which is coupled to the tuner 102 and which performs noise reduction filtering on the digital signal provided by the tuner 102.

In addition, the apparatus 100 includes a de-interlacing process block 106 which is coupled to the noise reduction filtering block 104 and which performs de-interlacing of the digital video signal in accordance with some embodiments. (It will be appreciated that the de-interlacing process block 106 may be considered to be coupled to the tuner 102 via the noise reduction filter block 104.)

Further, the apparatus 100 may include one or more other image signal processing blocks (indicated at 108) to perform one or more other processes on the de-interlaced video signal, such as sharpness enhancement, color correction, gamma correction, etc.

The apparatus 100 may also include a scaling block 110 (shown in phantom) to perform resizing of the image for display on a digital display component 112, which is also included in the apparatus 100.

Except for the de-interlacing process block 100, the components of the apparatus 100 may be configured and may operate in accordance with conventional practices.

Figure 2:
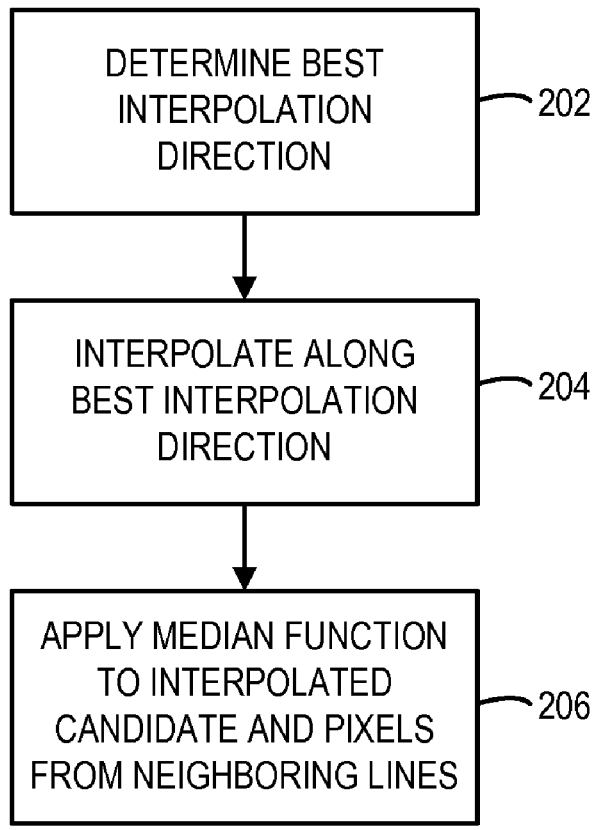
FIG. 2 is a flow chart that illustrates a de-interlacing process provided according to some embodiments.

FIG. 2 is a flow chart that illustrates a de-interlacing process provided according to some embodiments. The process may be performed at some or all of the locations of pixels that are to be interpolated to supply missing lines of a video signal field and thus to de-interlace the video signal field. This process may be considered to be an intra-field de-interlacing process, since the interpolation of missing pixels relies only on pixel data from other pixels in the same field. Each process stage illustrated at FIG. 2 may be performed at a single pixel location for a pixel to be interpolated, and may be repeated at each pixel location.

(At top, bottom and/or side edges, needed pixel values may be generated by processes such as filling with black pixels, filling with duplicates of edge pixel values, or mirroring pixel values from the edge. Alternatively at the edges a de-interlacing process such as "bob" or "weave" may be used in place of the process illustrated in FIG. 2.)

Figure 3:
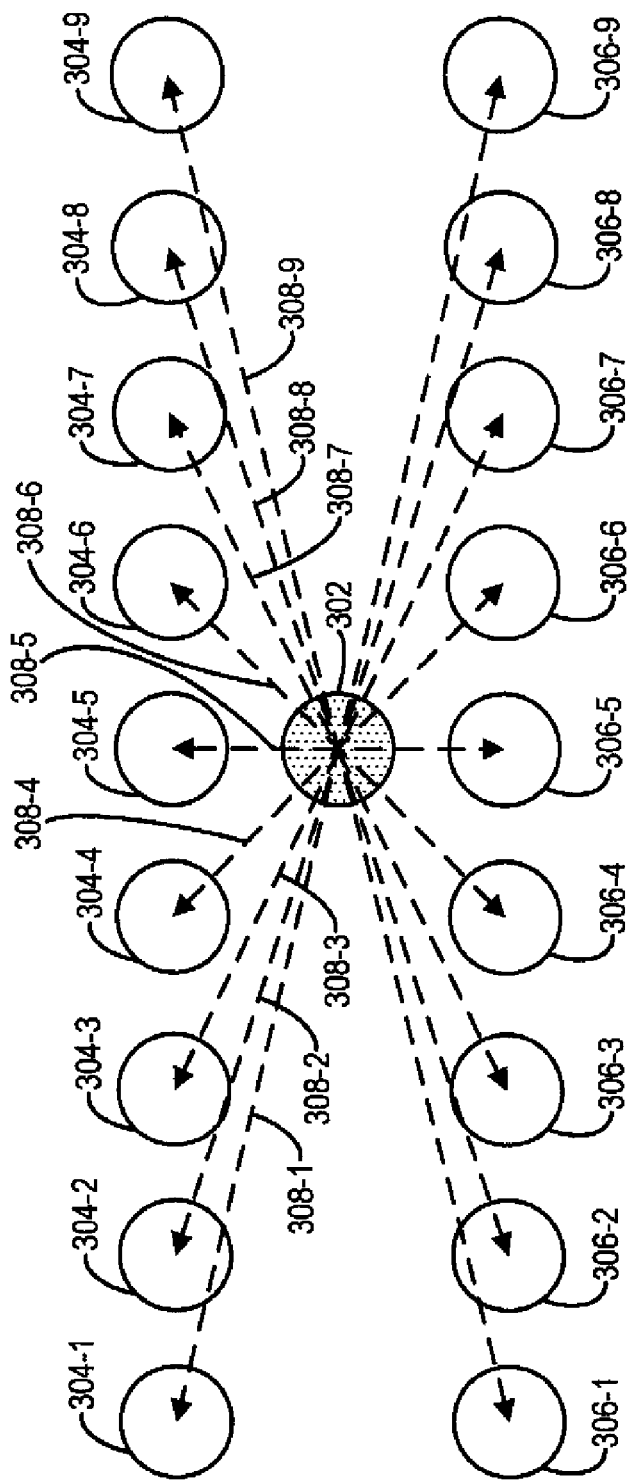
FIG. 3 schematically illustrates an aspect of the process of FIG. 2.

At 202 in FIG. 2, an interpolation direction is determined to be the best direction in which to perform interpolation at the current pixel location. That is, the edge gradient, if any, is measured in a number of different directions. More specifically, a score is calculated for each of a number of possible interpolation directions and the interpolation direction which has the lowest score is determined. FIG. 3 schematically illustrates an example of a set of possible interpolation directions that may be scored in accordance with some embodiments to detect edge gradients. In FIG. 3, shaded circle 302 indicates the location for a pixel for which the pixel value is currently being interpolated. Pixels 304-1 to 304-9 are pixels that make up part of a video signal line that is immediately above current pixel location 302. It will be understood that the pixel values for pixels 304-1 to 304-9 are available, since the line that includes those pixels is included in the current field, whereas the line that includes pixel location 302 is a missing line that is to be supplied by interpolation in order to de-interlace the current field. Pixel 304-5 is the pixel that is immediately above the current pixel location 302. Pixel 304-4 is the pixel that is immediately to the left of pixel 304-5; pixel 304-3 is the pixel that is immediately to the left of pixel 304-4; pixel 304-2 is the pixel that is immediately to the left of pixel 304-3; pixel 304-1 is the pixel that is immediately to the left of pixel 304-2. Pixel 304-6 is the pixel that is immediately to the right of pixel 304-5; pixel 304-7 is the pixel that is immediately to the right of pixel 304-6; pixel 304-8 is the pixel that is immediately to the right of pixel 304-7; pixel 304-9 is the pixel that is immediately to the right of pixel 304-8.

Pixels 306-1 to 306-9 are pixels that make up part of a video signal line that is immediately below current pixel location 302. Again, the pixel values for pixels 306-1 to 306-9 are available since the line that includes those pixels is included in the current field. Pixel 306-5 is the pixel that is immediately below the current pixel location 302. Pixel 306-4 is the pixel that is immediately to the left of pixel 306-5; pixel 306-3 is the pixel that is immediately to the left of pixel 306-4; pixel 306-2 is the pixel that is immediately to the left of pixel 306-3; pixel 306-1 is the pixel that is immediately to the left of pixel 306-2. Pixel 306-6 is the pixel that is immediately to the right of pixel 306-5; pixel 306-7 is the pixel that is immediately to the right of pixel 306-6; pixel 306-8 is the pixel that is immediately to the right of pixel 306-7; pixel 306-9 is the pixel that is immediately to the right of pixel 306-8.

In the embodiments illustrated by FIG. 3, nine possible interpolation directions are examined (scored) and one of the nine directions is selected. The nine possible directions include: (a) direction 308-1, which runs from pixel 304-1 through pixel location 302 to pixel 306-9; (b) direction 308-2, which runs from pixel 304-2 through pixel location 302 to pixel 306-8; (c) direction 308-3, which runs from pixel 304-3 through pixel location 302 to pixel 306-7; (d) direction 308-4, which runs from pixel 304-4 through pixel location 302 to pixel 306-6; (e) direction 308-5, which runs from pixel 304-5 through pixel location 302 to pixel 306-5; (f) direction 308-6, which runs from pixel 304-6 through pixel location 302 to pixel 306-4; (g) direction 308-7, which runs from pixel 304-7 through pixel location 302 to pixel 306-3; (h) direction 308-8, which runs from pixel 304-8 through pixel location 302 to pixel 306-2; (i) direction 308-9, which runs from pixel 304-9 through pixel location 302 to pixel 306-1.

Figure 4:
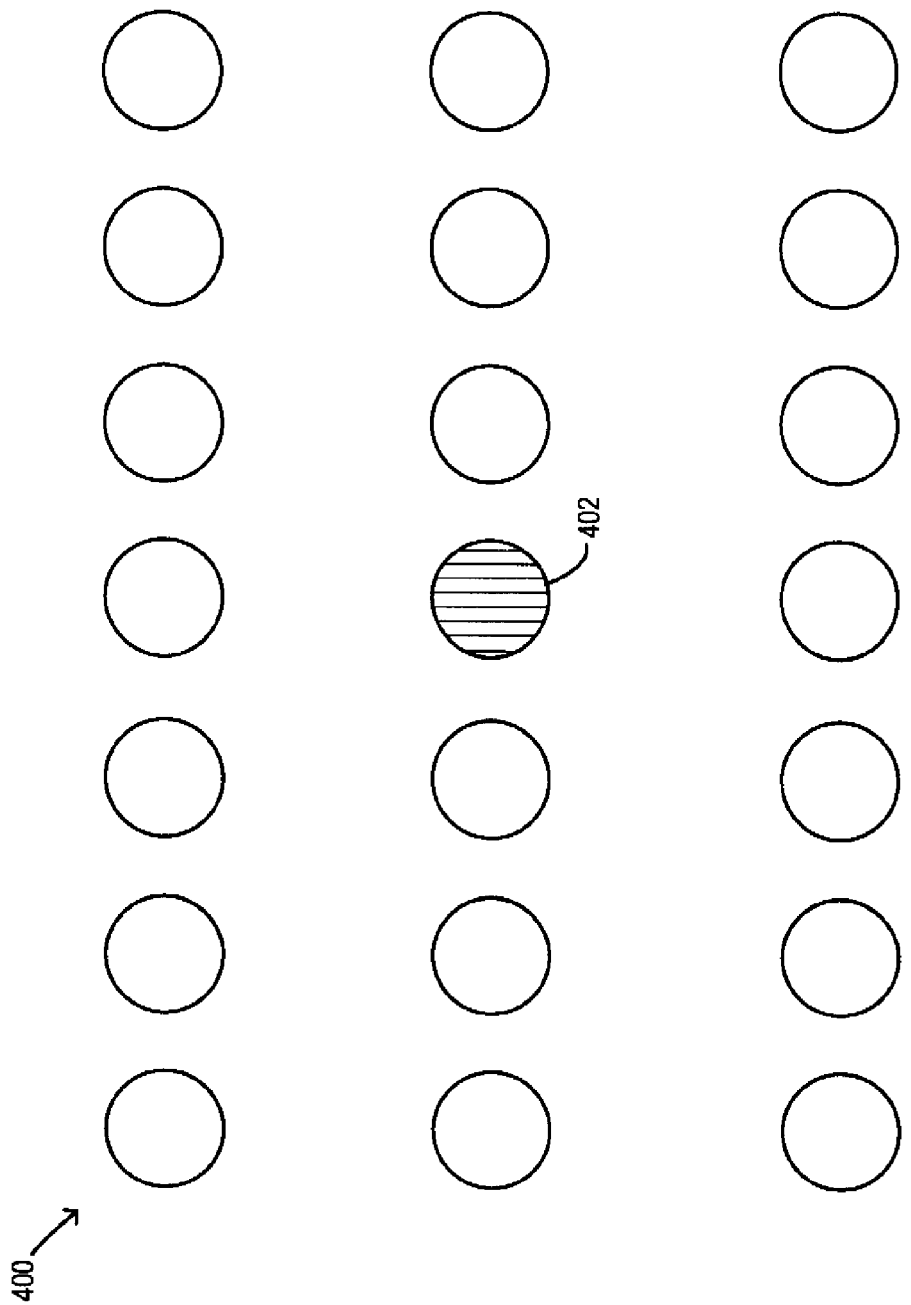
FIG. 4 schematically illustrates another aspect of the process of FIG. 2.

In accordance with some embodiments, the examination or scoring for each direction may include calculating a sum of absolute differences between (i) a rectangular group of pixels that is centered at the one of pixels 304 which corresponds to the direction in question and (ii) a rectangular group of pixels that is centered at the one of pixels 306 which corresponds to the direction in question. To illustrate, in the case of scoring the direction 308-3, the sum of absolute differences (SAD) is calculated between a rectangular group of pixels that is centered at pixel 304-3 and a rectangular group of pixels that is centered at pixel 306-7. FIG. 4 schematically illustrates such a rectangular group of pixels 400, centered at pixel 402 (which may be pixel 304-3 or pixel 306-7 as the case may be, when the direction 308-3 is being scored). The group 400 may include only pixels that were originally in the field being processed, and not interpolated pixels. In this example, the rectangular group of pixels, or window, has the dimensions 3 pixels down by 7 pixels across.

For each of the nine possible interpolation directions, let Window 1 be the window centered at the corresponding pixel 304 for the direction in question (e.g., pixel 304-3 in the case of direction 308-3) and let Window 2 be the window centered at the corresponding pixel 306 for the direction in question (e.g., pixel 306-7 in the case of direction 308-3). Let $P_1(i,j)$ be the pixel value for the i'th pixel in the j'th row of Window 1 and let $P_2(i,j)$ be the pixel value for the i'th pixel in the j'th row of Window 2.

For each possible interpolation direction, the SAD, which is the score for the direction, may be calculated as follows:

$$\sum_{1\leq i\leq 7, 1\leq j\leq 3} |P_1(i,j) - P_2(i,j)|$$

The direction which is found to have the lowest score (i.e., the lowest SAD) is determined to be the best interpolation direction. In other words, the direction which shows the least edge gradient is selected as the direction along which interpolation occurs. At 204 in FIG. 2, interpolation along the selected direction is performed by taking the arithmetic mean of the respective values for the pixel 304 and the pixel 306 which correspond to the selected direction. For example, if direction 308-3 is selected (as having the lowest SAD score), then the arithmetic mean is taken of the values of pixels 304-3 and 306-7. The resulting mean value is considered to be a candidate pixel value and is taken as one input of a median function which is applied at 206 in FIG. 2. In some embodiments, the median function has six other inputs, namely the six pixel values of pixels 304-4, 304-5, 304-6, 306-4, 306-5 and 306-6. The output of the median function is taken as the interpolated pixel value for the current pixel location 302.

Instead of examining nine possible interpolation directions, as in the example above, in other embodiments the number of possible interpolation directions to be examined may be three, five, seven, eleven or more, or other numbers of interpolation directions.

The window dimensions for the SAD calculation need not be three pixels by seven pixels; other dimensions may be used. In some embodiments, effectively the window may only be a single pixel, namely the pixel 304 or 306 associated with the interpolation direction that is being examined (i.e., scored). To be more explicit, in these embodiments the score for each interpolation direction may be the absolute value of the difference between the respective values for the pixel 304 and the pixel 306 associated with the interpolation direction in question.

In some embodiments, the number of inputs to the median function may be other than seven. For example, in some embodiments the number of inputs to the median function may be three, namely the candidate pixel value calculated at 204 plus the respective values for pixels 304-5 and 306-5.

The intra-field de-interlacing process described with reference to FIGS. 2-4 may produce quite good image quality while requiring a rather modest degree of calculating complexity. Consequently, the process of FIGS. 2-4 may embody a favorable trade-off between complexity and image quality.

In other embodiments, a motion-compensated de-interlacing process as described below in connection with FIGS. 5-9 may be performed.

Figure 5:
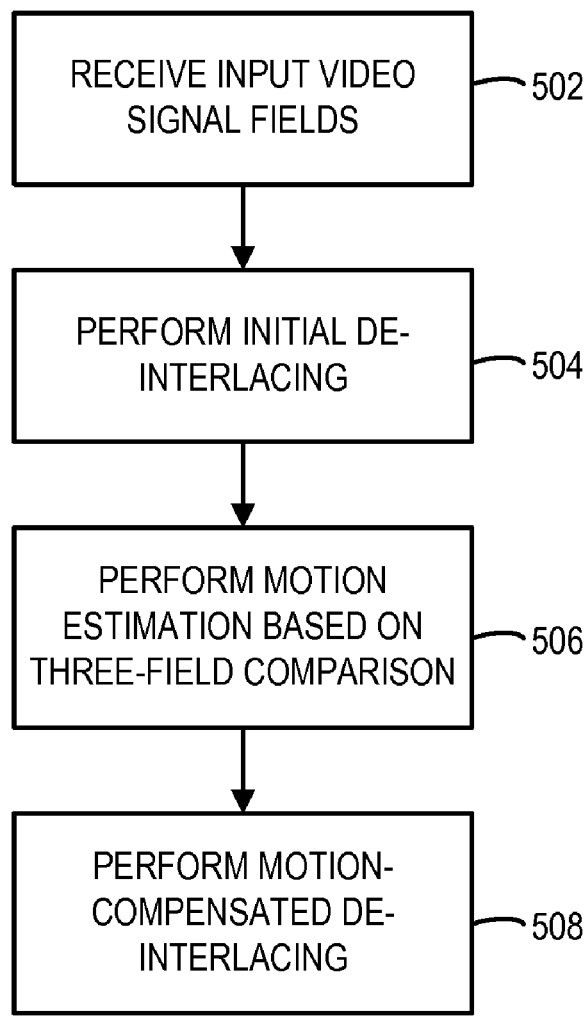
FIG. 5 is a flow chart that illustrates a de-interlacing process provided according to some other embodiments.

FIG. 5 is a flow chart that illustrates a motion-compensated de-interlacing process provided according to some embodiments. At 502 in FIG. 5, a sequence of interlaced video signal fields is received. The sequence includes a current field (sometimes referred to as "field N") that is being subjected to motion compensated de-interlacing, a previous field (sometimes referred to as "field N−1") which immediately precedes field N in the sequence of video signal fields, and a succeeding field (sometimes referred to as "field N+1") which immediately follows field N in the sequence of video fields.

At 504 in FIG. 5, an initial de-interlacing process is performed with respect to each one of fields N−1, N and N+1. For example, in each case the initial de-interlacing process may be an intra-field de-interlacing process such as the edge gradient adaptive process described above in connection with FIGS. 2-4 (which, as indicated above includes detecting edge gradients at the locus of the pixel to be interpolated). In other embodiments, the initial de-interlacing process may be a conventional "bob" de-interlace.

Figure 6:
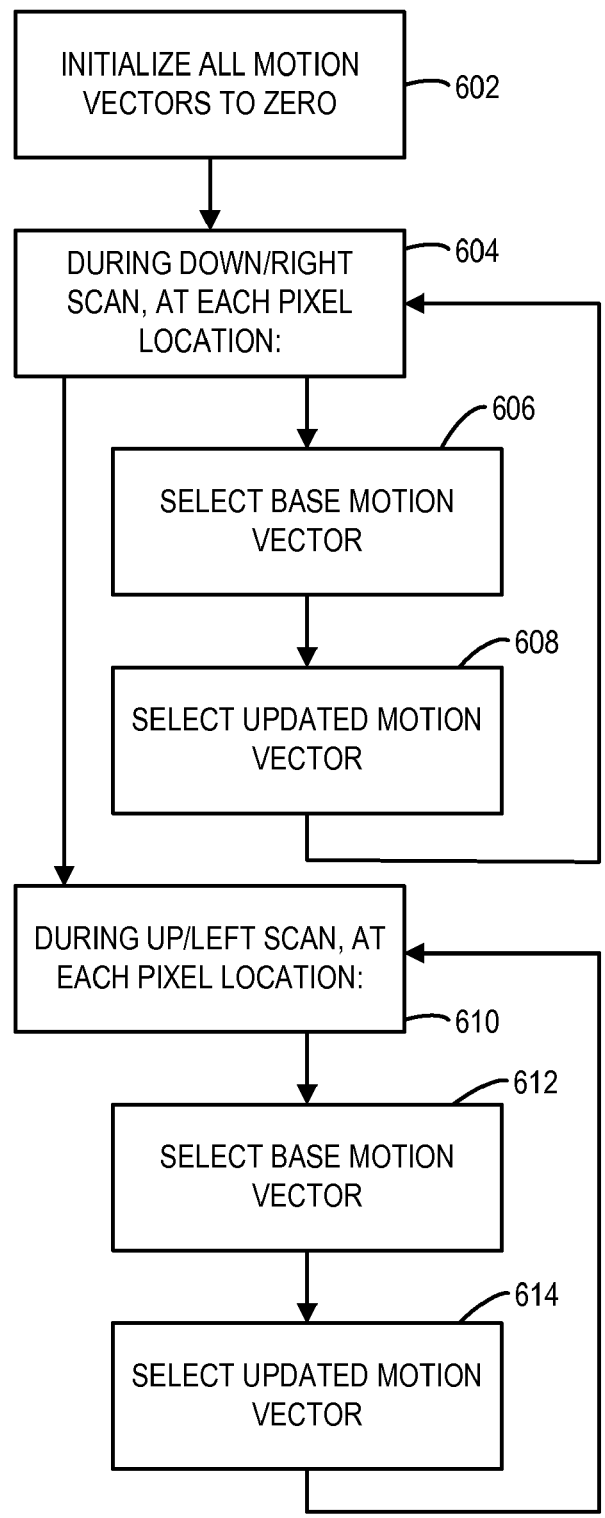
FIG. 6 is a flow chart that illustrates some details of the process of FIG. 5.
Figure 7:
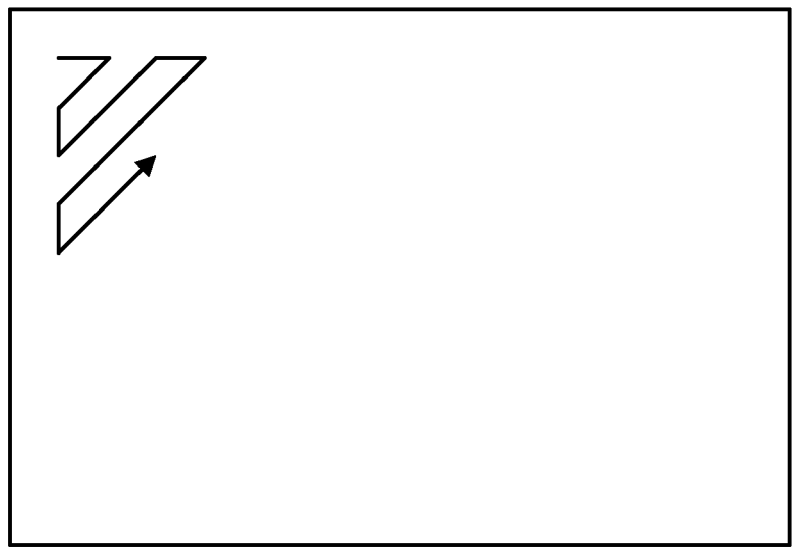
FIGS. 7-9 schematically illustrate aspects of the process of FIGS. 5-6.
Figure 8:
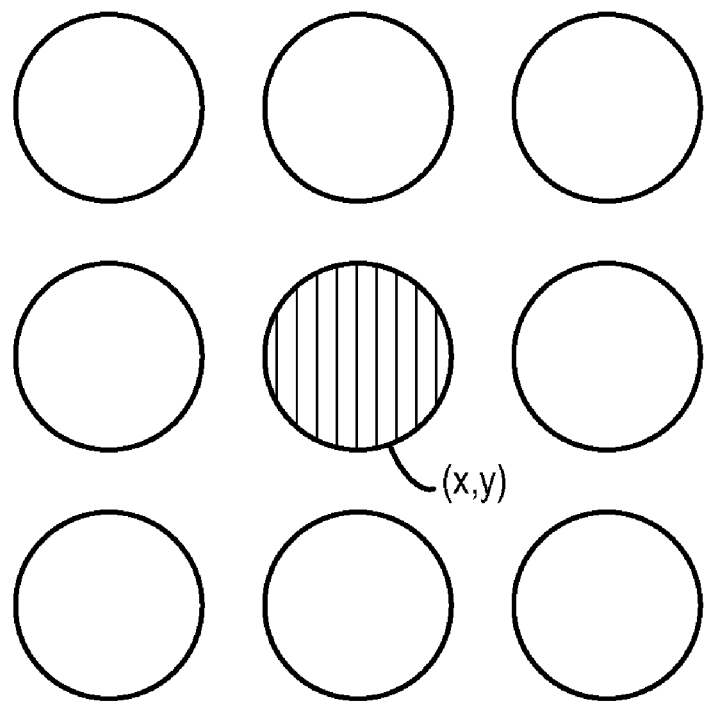

At 506 in FIG. 5, motion estimation is performed with respect to field N to determine motion vectors for field N. FIG. 6 is a flow chart that illustrates details of the motion estimation performed at 506. Let $\vec{D}(x,y,N,N-1)$ denote the motion vector which indicates motion from field N−1 to field N for the pixel location (x,y) in field N. At 602 in FIG. 6, $\vec{D}(x,y,N,N-1)$ is initialized to zero for each pixel location. Then, at 604, field N is zig-zag scanned from the upper left hand corner to the lower right hand corner, as schematically illustrated in FIG. 7. At each pixel location encountered during the scan of 604, the loop 606-608 is performed. The scan may visit only locations for which pixel values are to be interpolated. At 606, a base motion vector $\vec{D}_0$ is selected from the candidate set $\{\vec{D}(x-1,y,N,N-1), \vec{D}(x,y-1,N,N-1)\}$, where $\vec{D}(x-1,y,N,N-1)$ is the motion vector currently assigned to the pixel location (x−1,y) which is immediately to the left of the current pixel location (x,y) and $\vec{D}(x,y-1,N,N-1)$ is the motion vector currently assigned to the pixel location (x, y−1) which is immediately above the current pixel location. The selection is performed on the basis of a score assigned to each motion vector in the candidate set, where the score is calculated with respect to a window win (x,y) of pixel locations centered at the current pixel location (x,y). In some embodiments, the dimensions of win(x,y) may be three pixels by three pixels, as illustrated in FIG. 8. Windows of other dimensions may be used. In general it may be desirable to increase the size of the window, subject to constraints on complexity and/or size of the processing circuitry and/or processing time. The score for each motion vector in the candidate set of motion vectors may be calculated according to the following sum of absolute difference formula:

$$\sum_{(x',y')\in win(x,y)} \begin{pmatrix} \alpha|P_N(x',y') - P_{N-1}(x'+dx, y'+dy)| + \\ \beta|P_{N+1}(x'-dx, y'-dy) - P_{N-1}(x'+dx, y'+dy)| \end{pmatrix},$$

where:

(x',y') indicates a pixel location in win(x,y);

$P_N(\ )$ is the pixel value in field N at the indicated pixel location;

$P_{N-1}(\ )$ is the pixel value in field N−1 at the indicated pixel location;

$P_{N+1}(\ )$ is the pixel value in field N+1 at the indicated pixel location;

(dx,dy) is the value of the motion vector that is being scored; and $\alpha,\beta$ are weighting factors.

In some embodiments $\alpha=\beta=1$.

It will be appreciated that the first absolute value term in the above formula implements a comparison between fields N and N−1, whereas the second absolute value term implements a comparison between fields N−1 and N+1. Thus this formula implements motion estimation based on the immediate past field, the current field and the immediate future field. The motion vector from the candidate set which has the lowest score according to this formula is selected to be the base motion vector $\vec{D}_0$.

At 608 an updated motion vector $\vec{D}_1(x,y,N,N-1)$ is selected from the candidate set $\{\vec{D}_0+(0,0), \vec{D}_0+(1,0), \vec{D}_0+(0,1), \vec{D}_0+(-1,0), \vec{D}_0+(0,-1)\}$. The motion vectors in the latter set may be scored in accordance with the same formula set forth above in connection with 606, and the motion vector from this set having the lowest score is selected to be the updated motion vector $\vec{D}_1(x,y,N,N-1)$. The motion vector $\vec{D}(x,y,N,N-1)$ applicable to the current pixel location (x,y) in field N is then updated to equal $\vec{D}(x,y,N,N-1)$.

Figure 9:
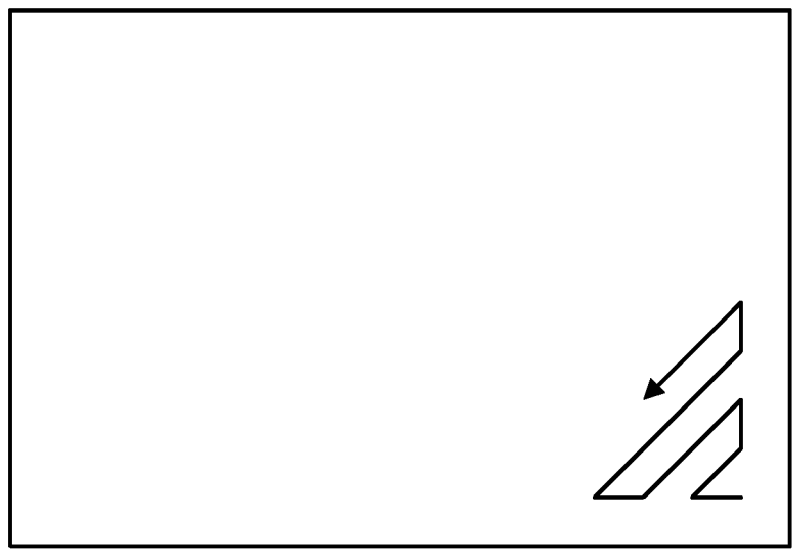

At 610 field N is zig-zag scanned from the lower left hand corner to the upper right hand corner, as schematically illustrated in FIG. 9. At each pixel location encountered during the scan of 610, the loop 612-614 is performed. At 612, a base motion vector $\vec{D}_2$ is selected from the candidate set $\{\vec{D}(x,y,N,N-1), \vec{D}(x+1,y,N,N-1), \vec{D}(x,y+1,N,N-1)\}$, where $\vec{D}(x+1,y,N,N-1)$ is the motion vector assigned to the pixel location (x+1,y) which is immediately to the right of the current pixel location (x,y) and $\vec{D}(x,y+1,N,N-1)$ is the motion vector assigned to the pixel location (x,y+1) which is immediately below the current pixel location. The motion vectors in the latter set may be scored in accordance with the same formula set forth above in connection with 606, and the motion vector from this set having the lowest score is selected to be the base motion vector $\vec{D}_2$.

At 614 an updated motion vector $\vec{D}_3(x,y,N,N-1)$ is selected from the candidate set $\{\vec{D}_2+(0,0), \vec{D}_2+(1,0), \vec{D}_2+(0,1), \vec{D}_2+(-1,0), \vec{D}_2+(0,-1)\}$. The motion vectors in the latter set may be scored in accordance with the same formula set forth above in connection with 606, and the motion vector from this set having the lowest score is selected to be the updated motion vector $\vec{D}_3(x,y,N,N-1)$. The motion vector $\vec{D}(x,y,N,N-1)$ applicable to the current pixel location (x,y) in field N is then updated to equal $\vec{D}_3(x,y,N,N-1)$.

(At top, bottom and/or side edges, needed pixel values may be generated by processes such as filling with black pixels, filling with duplicates of edge pixel values, or mirroring pixel values from the edge.)

With the completion of the upward scan at 610 and the associated loops of 612-614, the motion estimation is complete, and all of the necessary motion vectors have been determined for field N. Referring again to FIG. 5, at 508 motion-compensated de-interlacing is performed with respect to field N, using the motion vectors determined at 506. The motion-compensated de-interlacing performed at 508 may be in accordance with conventional practices, noting however that the motion estimation performed at 506 to obtain the motion vectors departs from conventional practices. In accordance with conventional practices, a pixel in the reference image (e.g., field N−1) is shifted by the motion vector obtained at 506 and then is filled in to the place required. The reference pixel may come, in some embodiments, either from field N−1 or from field N+1. Median filtering may also be applied to filter out errors.

The process of FIG. 5 may be performed with respect to each field of the input video signal. This process, and particularly the motion estimation described in conjunction with 506, may produce very superior results in terms of image quality.

In some embodiments, motion compensated de-interlaced pixels for field N−1 may be used in the motion-estimation process for field N instead of using intra-field de-interlaced pixels for field N−1. However, in such cases there may be a risk of propagation of errors in the event of a scene change. Thus it may be advisable to employ scene change detection if motion compensated de-interlaced pixels for field N−1 are used in performing motion estimation for field N.

In some embodiments, motion estimation and motion-compensated de-interlacing may be performed backwards from field N+1 to field N rather than forward from field N−1 to field N. In such cases, the motion vector scoring formula may be changed so that the first absolute value term compares a pixel value from field N to a pixel value from field N+1 rather than comparing the pixel value from field N to a pixel value from field N−1.

In some embodiments, the motion estimation for field N may be performed with reference to fields N−1 and N−2, or with reference to fields N+1 and N+2, instead of with reference to fields N−1 and N+1. For example, if the motion estimation is performed with reference to fields N−1 and N−2, the following sum of absolute difference formula may be used in place of the formula set forth above with reference to 606:

$$\sum_{(x',y')\in win(x,y)} \begin{pmatrix} \alpha|P_N(x',y') - P_{N-1}(x'+dx, y'+dy)| + \\ \beta|P_{N-2}(x'+2dx, y'+2dy) - P_N(x',y')| \end{pmatrix}.$$

Figure 10:
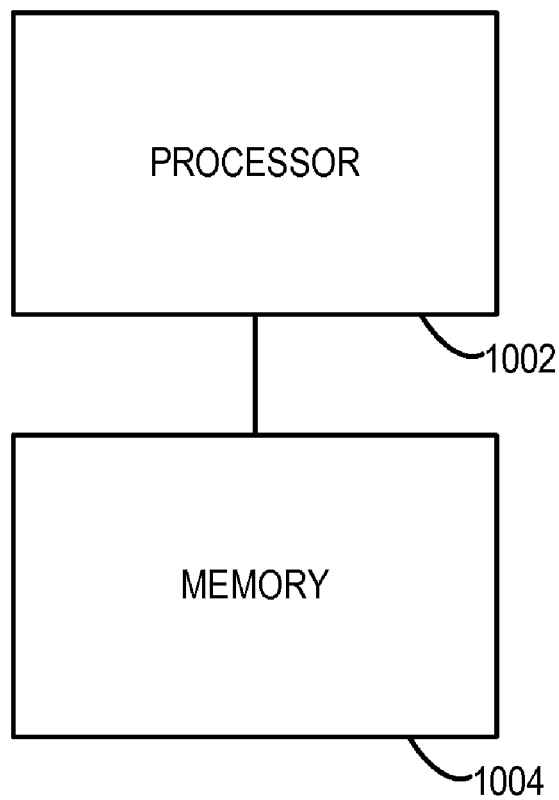
FIG. 10 is a block diagram of an embodiment of the de-interlacing component of the apparatus of FIG. 1.

In some embodiments, the de-interlacing process block may be implemented in the form of application-specific integrated circuitry, configured to perform either or both of the de-interlacing processes described in connection with FIGS. 2-4 and FIGS. 5-9. In other embodiments, the de-interlacing process block may be constituted at least in part by a processor 1002 (FIG. 10) coupled to a memory 1004. The processor 1002 may be, for example, a general purpose microprocessor or digital signal processor or other programmable processor. The memory 1004 may store software instructions to control the processor 1002 to perform one of the de-interlacing processes described above, and may also serve as working memory and/or input and/or output digital video signal storage memory.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
   receiving, in a de-interlacing processor, a sequence of interlaced video signal fields, said sequence including a first field, a second field which immediately follows the first field in said sequence, and a third field which immediately follows the second field in said sequence;
   applying, in the de-interlacing processor, an initial de-interlacing procedure to said first field, second and third fields to generate initial de-interlaced pixel data for said first, second and third fields, said initial de-interlacing not including motion compensation;
   performing, in the de-interlacing processor, motion estimation with respect to the initial de-interlaced pixel data for one of said first, second and third fields to determine motion vectors for said one of said first, second and third fields, said motion estimation including comparing at least one pixel in said first field with at least one pixel in said third field; and
   performing, in the de-interlacing processor, motion-compensated de-interlacing on said one of said first, second and third fields using the motion vectors determined by said motion estimation to generate second de-interlaced pixel data, different from said initial de-interlaced pixel data, for said one of said first, second and third fields, said motion-compensated de-interlacing for each of said fields being performed after said initial de-interlacing for said each of said fields.

2. The method of claim 1, wherein said motion estimation includes:
   scanning the current field from a top corner to a bottom corner, and during the scanning, at each pixel location, selecting a motion vector from a set of candidate motion vectors; and
   scanning the current field from said bottom corner to said top corner, and during the scanning from said bottom corner to said top corner, at each pixel location, selecting a motion vector from a set of candidate motion vectors.

3. The method of claim 1, wherein:
   the comparing at least one pixel value in said first field with at least one pixel value in said third field includes performing a sum of absolute difference (SAD) calculation with respect to a window of pixel locations centered at a current pixel location.

4. The method of claim 1, wherein said second field is said one of said first, second and third fields for which motion vectors are determined.

5. The method of claim 1, wherein said first field is said one of said first, second and third fields for which motion vectors are determined.

6. The method of claim 1, wherein said third field is said one of said first, second and third fields for which motion vectors are determined.

7. The method of claim 1, wherein the initial de-interlacing procedure, as applied to at least one of said previous field, said current field, and said succeeding field, includes detecting edge gradients at a locus of a pixel to be interpolated.

* * * * *